June 17, 1930.  A. W. ROSEN  1,765,099
DEVICE FOR SUPPORTING ARTICLES ON TIRES OR THE LIKE
Filed March 22, 1928
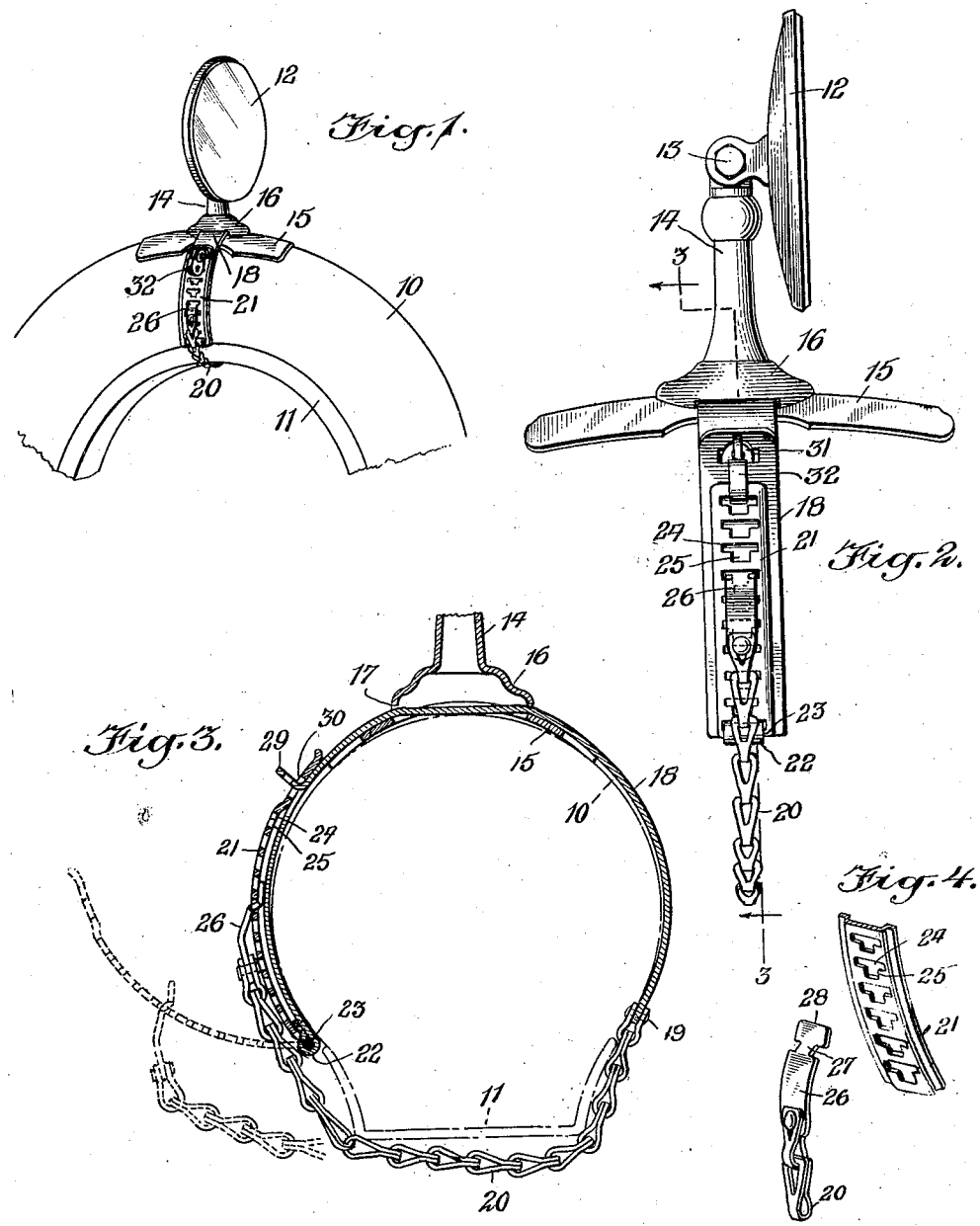
WITNESSES
INVENTOR
A. W. Rosen
BY
ATTORNEY Patented June 17, 1930

1,765,099

UNITED STATES PATENT OFFICE

ABRAHAM W. ROSEN, OF NEW YORK, N. Y.

DEVICE FOR SUPPORTING ARTICLES ON TIRES OR THE LIKE

Application filed March 22, 1928. Serial No. 263,748.

The device of the present invention is capable of a wide range of utility as an article holder or article securing means, and it is peculiarly adapted and primarily intended for supporting an article such for instance as a mirror on the spare tire of an automobile.

It is common practice to carry spare tires on the running board of a car in such a position that a mirror thereon may be conveniently observed by the driver, and afford a visual indication of the road behind the car.

One of the principal objections however, to this type of mirror, has been the fact that no adequate means has been provided for preventing theft of the mirror.

In accordance with the present invention I provide an attaching means for mirrors or other articles, so arranged that it is proof against theft even though the tire which supports the mirror becomes deflated, and the supporting means becomes loose on the tire.

Other and more general objects of the invention are to provide a mirror supporting means of this character which will be of simple, practical construction, rugged, durable and efficient in use, and well suited to the requirements of economical manufacture and convenient application and removal.

With the above noted and other objects in view, the invention consists in certain novel features of construction and combinations and arrangements of parts as will be more fully hereinafter set forth and pointed out in the claims. The invention may be more fully understood from the following description in connection with the accompanying drawings, wherein—

Fig. 1 is a fragmentary perspective view showing a device of the present invention in operative position to support a mirror on a tire.

Fig. 2 is a side elevational view of the device.

Fig. 3 is a vertical sectional view on the line 3—3 of Fig. 2.

Fig. 4 is a fragmentary detail view showing a section of the locking lever and the anchoring member for the flexible device just before the anchoring member is attached to the locking lever.

In the drawings I have used the reference numeral 10 to indicate a spare tire carried on the usual rim 11, and in practice commonly mounted on the running board of a car. I have shown the article to be supported on the tire as consisting of a mirror 12 of any conventional type pivotally or universally mounted as at 13 on a standard 14, which standard is preferably hollow and integral with a supporting platform 15 longitudinally curved in accordance with the curvature of the tire. The standard and platform are joined together through a flaring, generally inverted cup shaped section 16 having diametrically opposed slots therein through which a metal strap 18 is adapted to be passed. This strap lies against the platform and extends under the cup, and is sufficiently flexible and resilient to be conveniently slightly bent to accommodate various sizes of tires.

To one end of the strap 18 there is anchored at 19 a flexible device 20, preferably a chain, while to the other end of the strap 18 there is pivotally secured a lever 21 having a curvature which is approximately the same as the curvature of the strap. To effect convenient pivotal mounting of the lever 21, the end of the strap 18 may be conveniently reduced and bent back upon itself to form a loop 22, and the end of the lever may be slotted to provide a cross bar 23 which is received in the loop and affords the pivotal connection between the strap and lever.

An important feature of the invention is the three-fold function which is performed by the lever 21. This lever serves as an anchorage for the free end of the chain 20, as a lock to prevent disengagement of the anchored end of the chain, and as a take-up for tightening the chain about the tire as the lever is swung from the dotted line to the full line position of Fig. 3.

The lever is provided with a series of elongated transverse openings 24, each communicating at its lower edge with a notch 25. The free end of the chain 20 carries an anchoring device in the nature of a plate 26 having a reduced neck 27 inclining away from the plane of the plate, which neck carries an offset head 28 lying approximately in the plane of the plate 26 and offset therefrom.

With the lever in the dotted line position of Fig. 3, the head 28 may be conveniently inserted through any one of the slots 24, and the weight of the chain will immediately pull the neck 27 into the associated slot 25 of the notch. As the lever is swung from the dotted line to the full line position of Fig. 3, the head 28 engages with the strap 18, tending to rock the anchoring member about the neck 27 as a fulcrum, and as the lever reaches its home position, the head 28 will be firmly clamped between the lever 21 and the strap 18. In order to disengage the head 28 it would be necessary to tilt it relatively to the lever in order that the head might be withdrawn through the slot 24. Since however, the lever and strap cooperatively clamp the head flatly between them in such a manner that it cannot possibly be tilted, and inasmuch as the construction of the anchoring member is such that no direct pull or, in fact, no pull in any direction, will disengage the head 28, it will be seen that the free end of the chain is firmly anchored and locked by the lever 21 as the lever is moved to the full line position of Fig. 3.

Preferably, as the lever is swung against the strap, an apertured ear 29 struck outwardly from the body of the strap 18 passes through an opening 30 in the free end of the lever, and may conveniently receive the hasp 31 of a padlock 32 to prevent unauthorized movement of the lever toward chain-slacking or anchor-releasing position.

Due to the flexibility of the strap 18, and the adjustability provided by the series of notches in the lever 21, the device may be conveniently used for attaching an article to a wide range of tire sizes. The attachment may be very easily performed without any great manual effort, and the operation is substantially as follows. Strap 18 is placed on the tire, straddling the latter, lever 21 is swung open, the head 28 of the anchoring member is inserted through the proper slot 24 as shown in dotted lines (Fig. 3). As the lever is swung back against the strap 18, the head 28 is clamped between the lever and the strap, and the chain 20 is tightened about the tire, a padlock may then be inserted through the ear 29 to complete the locking of the device against unauthorized removal.

Obviously, various changes and alterations might be made in the general form and arrangement of the parts described without departing from the invention. Hence I do not wish to limit myself to the details set forth, but shall consider myself at liberty to make such changes and alterations as fairly fall within the spirit and scope of the appended claims.

I claim:
1. An adjustable anchoring, tightening and securing device of the class described including a stationary plate, a lever hingedly connected thereto and capable of being swung flatly thereagainst, said lever having a plurality of transverse slots therein and having notches therein intersecting the intermediate portion of each slot, an anchoring member adapted to be carried by the free end of a flexible device, said member including a body, a neck inclined relatively to the body and sufficiently narrow to fit within the notches, a head at the end of the neck offset from the plane of the body, said head being wider than the notches and narrower than the slots, whereby as the head is inserted through one of the notches and the lever swung against the plate, the flexible device will be tightened and the head clamped between the lever and plate and locked against withdrawal.

2. Means for securing an article upon a tire or the like, including a metal strap embracing the tire and adapted to support an article, a lever hinged to one end of the strap, a flexible device anchored to the other end of the strap and including a free end engageable with the lever, said lever having a series of receiving notches therein for the reception of an anchoring member on the end of the flexible device, said lever, notches, and anchoring member being so shaped that as the lever is swung against the plate, a portion of the anchoring member is clamped between lever and plate and the flexible device tightened about the tire.

3. A device of the class described including a metal strap adapted to partially embrace a tire or the like and adapted to support an article, a lever hingedly connected to one end of the strap and adapted to be swung flatly thereagainst, a flexible device anchored to the other end of the strap, an anchoring member at the free end of the flexible device engageable with any of a series of openings in the lever, said anchoring device being so shaped that it is clamped between the lever and plate as the lever is swung against the plate to tighten the flexible device.

4. A device of the class described including a metal strap adapted to partially embrace a tire or the like and adapted to support an article, a lever hingedly connected to one end of the strap and adapted to be swung flatly thereagainst, a flexible device anchored to the other end of the strap, an anchoring member at the free end of the flexible device engageable with any of a series of openings in the lever, said anchoring device being so shaped that it is clamped between the lever and plate as the lever is swung against the plate to tighten the flexible device, an apertured ear struck from the strap, said lever having an opening therein through which the ear projects when the lever lies against the strap, whereby a padlock or the like may be applied to the ear to prevent movement of the lever toward releasing position.

5. An adjustable anchoring, tightening, and securing device of the class described including a base and associated metal strap adapted to partially embrace a tire, a flexible device anchored at one end to one end of the strap, a lever hinged at one end to the other end of the strap, an anchoring member at the free end of the flexible device selectively engageable with any of a series of receiving devices associated with the lever, and means whereby said anchoring member is clamped between lever and strap as the lever is swung against the strap.

6. An adjustable, tightening, and securing device of the class described including a base and associated metal strap adapted to partially embrace a tire, a flexible device anchored at one end to one end of the strap, a lever hinged at one end to the other end of the strap, an anchoring member at the free end of the flexible device selectively engageable with any of a series of receiving devices associated with the lever, means whereby said anchoring member is clamped between lever and strap as the lever is swung against the strap, and means for locking the lever against opening movement.

Signed at New York in the county of New York and State of New York this 19th day of March, A. D. 1928.

ABRAHAM W. ROSEN.